June 27, 1967    F. V. DE FUSCO    3,327,496
SPEEDOMETER SEAL
Filed May 16, 1966
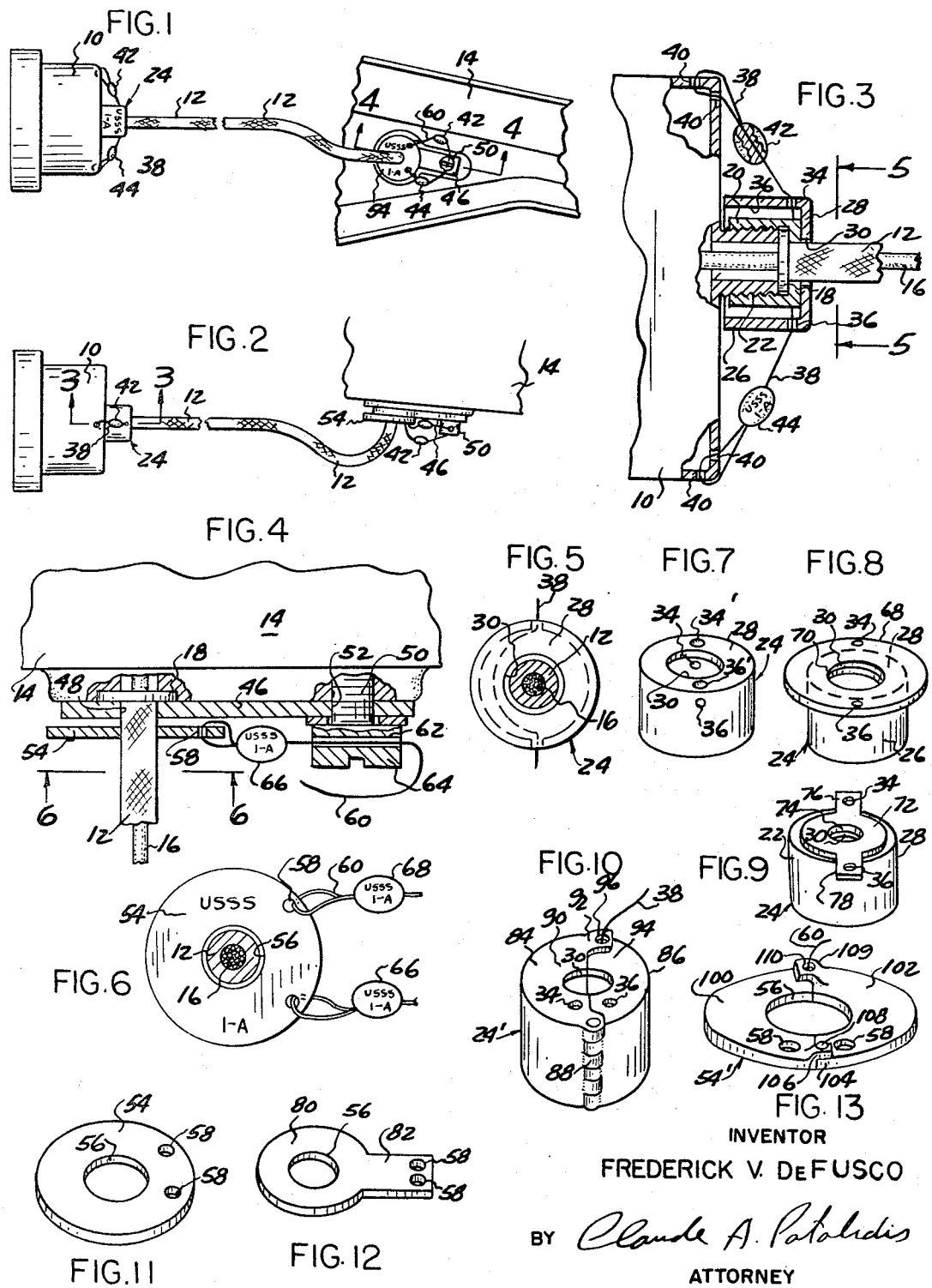
INVENTOR
FREDERICK V. DeFUSCO
BY Claude A. Patalidis
ATTORNEY United States Patent Office 3,327,496
Patented June 27, 1967

3,327,496
SPEEDOMETER SEAL
Frederick V. De Fusco, 32849 Hees,
Livonia, Mich. 48150
Filed May 16, 1966, Ser. No. 550,195
5 Claims. (Cl. 64—4)

ABSTRACT OF THE DISCLOSURE

A seal member disposed at the meter end of the odometer and speedometer drive flexible shaft for preventing unauthorized tampering with the drive shaft connection to the meter housing. Additionally, a similar seal member may be disposed at the transmission end of the drive flexible shaft. The seal member is attached to the respective meter or transmission housing by wires having their ends secured by a frangible seal.

---

The present invention relates to speedometer seals in general, and more particularly to sealing means mounted on both ends of an automobile odometer and speedometer cable in such a manner that the sealing means must be broken in order to disconnect the cable from the odometer and speedometer head as well as from the transmission housing.

The manufacturer original warranty on a new automobile is valid for a predetermined mileage or for a predetermined time, whichever occurs first, and any defective part which fails during the warranty period is replaced free of charge by an franchised dealer of the automobile manufacturer. In order to stretch the mileage portion of the warranty, some dishonest automobile buyers disconnect the speedometer cable, generally at the speedometer head housing, so that they can travel a considerable amount of miles without the odometer registering such mileage. On leased or rented automobiles, the fee charged the customer is often partly based on the mileage traveled while the automobile is in possession of the customer. In order to decrease the rental fee, there is a strong tendency among some fraudulent customers to also disconnect the speedometer cable so that the odometer does not register during a portion of the rental period.

Dishonest taxi drivers may also tamper with their taximeter control, consisting generally of a sheathed flexible cable substantially similar to an ordinary speedometer cable, and by disconnecting the cable from the taximeter head and from the speedometer head housing, they are able to travel many miles without their employer's knowledge.

Another reason for disconnecting the speedometer cable so that the odometer will not register is, for a car owner, the advantages resulting from being able to turn in, as trade-in, a used automobile with an apparent low mileage. In addition, it is very common for dealers of used automobiles to tamper with an automobile odometer by disconnecting the speedometer cable from the speedometer head housing and by means such as a fast electric motor advancing the odometer above 99,999 miles where the odometer is returned back to zero, and by continuing to wind up the odometer until it registers a reasonable amount of mileage, substantially lower than the actual mileage of the used automobile.

The present invention by providing a sealing means disposed around the casing or sheath of the speedometer cable at the coupling with the speedometer head housing, and by providing another sealing means mounted over the end of the speedometer cable fitting into the transmission housing, provides a simple, full-proof and inexpensive means for the prevention of fraudulent or unauthorized disconnection of a speedometer cable, and for providing evidence of attempted or actual tampering resulting in damaged or broken seals. The present invention provides a sealing means that can be used as original equipment on new automobiles and which is permanently mounted upon both ends of the speedometer cable sheath and which requires no or little modification or adaptation with respect to the parts upon which it is affixed. In addition, the principles of the present invention can be applied to sealing devices which may be added on at a later date which provide sealing means for both ends of the speedometer cable with practically no modification of the speedometer cable fittings or of the housings to which the fittings are attached.

The principal object of the invention, therefore, is to provide sealing means for both ends of a speedometer cable which prevents fraudulently disconnecting such cable for the purpose of intefering with the normal registration by the odometer of the mileage traveled by an automobile.

Another object of the invention is to provide sealing means for both ends of a speedometer cable that requires practically no modifications or adaptations with respect to the cable itself, its casing or sheath, the fittings thereof, and the parts to which the cable fittings are attached.

A further object of the invention is to provide sealing means for both ends of a speedometer cable that can be mounted upon an automobile during manufacturing thereof so as to insure against tampering or attempt at tampering with the normal functioning of the automobile odometer.

Yet another object of the invention is to provide sealing means which can be readily mounted on both ends of a speedometer cable, even after an automobile has been assembled, and which requires practically no modifications or adaptations with respect to the cable itself, its casing or sheath or with respect to the fittings of the cable and the parts upon which such fittings are attached.

Yet a further object of the invention is to provide such sealing means in a fool-proof and very efficient manner, at a very low cost, and in such a structure that the sealing means do not interfere with the proper functioning and maintenance of the speedometer, the speedometer cable and fittings thereof.

Other objects and advantages of the invention will become apparent when the following description of a few preferred examples of embodiments of the invention are considered in conjunction with the attached drawings, wherein:

FIG. 1 represents a schematic side elevation view of an example of an embodiment according to the present invention;

FIG. 2 is a top elevational view thereof;

FIG. 3 is a detailed cross sectional view from line 3—3 of FIG. 2;

FIG. 4 is a detailed cross sectional view from line 4—4 of FIG. 1;

FIG. 5 is a partial elevational view from line 5—5 of FIG. 3;

FIG. 6 is a partial elevational view from line 6—6 of FIG. 4;

FIG. 7 is a perspective view of an example of seal means according to the present invention;

FIG. 8 is a modification of the seal means of FIG. 7;

FIG. 9 is a perspective view of a further modification thereof;

FIG. 10 is a perspective view of still a further modification thereof;

FIG. 11 is a perspective view of the seal means of FIGS. 4 and 6;

FIG. 12 is a modification of the seal means of FIG. 11; and

FIG. 13 is a further modification of the seal means of FIGS. 11 and 12.

Referring now to the drawings, and more particularly to FIGS. 1 and 2 thereof, a speedometer and odometer head housing 10 comprises, in a conventional manner, a speedometer and odometer, not shown, which are driven by means of a flexible cable contained in a casing or sheath 12, the cable and its sheath forming a flexible and waterproof drive for a speedometer and odometer from a driving means generally forming part of the transmission and contained in the transmission housing 14. As generally shown in FIGS. 1 and 2 and as best seen in FIGS. 3 and 5, the sheath 12 containing the speedometer drive cable 16 has on one end thereof a permanently affixed fitting 18 held upon the speedometer head housing 10 by way of means such as the usual flange nut 20 threading upon the threaded diameter of a male coupling 22 integral with the speedometer head housing 10. Normally, flange nut 20 is provided around the periphery thereof with knurls or serrations which permit finger grip in order to turn the flange nut for the purpose of disconnecting the speedometer end of the cable 16. According to a preferred form of the present invention, the flange nut 20 is covered by a cup-like seal member 24 having a substantially cylindrical side wall 26 and an end wall 28 provided with a substantially centrally located circular aperture 30 of a diameter sufficient to afford passage to the cable sheath 12, whilst being smaller than the diameter of fitting 18. The inside surface of the cylindrical wall portion of the cup-like member, as shown at 32, may be coated with a thin layer of rubber, or the like, so as to prevent rattling, and the inside diameter of surface 32 is generally larger, by a small amount, than the outside diameter of flange nut 20. Cup-like member 24 may be made of solid or frangible material, and may preferably carry an inscription, such as the inscription USS1–A being shown, inscribed in a predetermined manner so as to detect fraudulent replacement of the cup-like member. The cup-like member 24 is provided with at least one pair of holes, as shown at 34 and 36, and a seal wire 38 is normally threaded through those holes and through appropriate attaching means which may be, as shown in the drawing, convenient holes such as 40 in the speedometer head housing, or which may, alternately, consist of a bracket provided with holes for threading of the wire, such bracket being affixed to the speedometer head housing 10 by means such as soldering or welding. The ends of seal wire 38 are enclosed in a cast seal, such as shown at 42 and 44, so as to be immobilized thereby and so as to provide a means of detection in the event that the ends of the wire are attempted to be disconnected. Cast seals 42 and 44 are preferably made of a frangible material and have impressed thereon a marking indicating their origin.

In some automobiles the end of the speedometer cable fitting into the transmission housing 14 is also provided with a flange nut, substantially similar to the speedometer flange nut 20 of FIG. 3, and where such an arrangement is provided, sealing means for the transmission housing end of the speedometer cable are substantially as hereinbefore explained and shown. However, another more prevalent conventional way of coupling the end of a speedometer cable upon the transmission housing is by means of the fitting arrangement shown in FIGS. 1–2 and 4. As best seen in FIGS. 4 and 6, the speedometer cable sheath 12 is provided with a fitting 18 that engages an appropriate undercut in the transmission housing 14, with leakage prevention means, such as O-rings and the like, conveniently placed for preventing leakage from inside of the housing to the ambient. The speedometer cable end provided with fitting 18 is held in position by means of a mounting or lock plate 46 provided with an aperture 48 adapted to receive the end of the cable sheath 12 and mounted upon housing 14 by any conventional means such as bolt 50 passing through a hole 52 in the plate and threading in an appropriate threaded bore in the housing. The transmission end of the seal means according to an example of a preferred embodiment of the invention comprises an annular member 54 having a substantially centrally disposed circular aperture 56 of a diameter sufficient to afford passage to the speedometer cable sheath 12 and smaller than the diameter of fitting 18. The annular member 54 is provided with at laest one hole 58 adapted to receive therethrough a loop of seal wire 60, seal wire 60 being further adapted to be threaded through an appropriate aperture 62 substantially diametrically disposed within the head 64 of bolt 50. The ends of seal wire 60 are conveniently immobilized by means such as frangible cast seals 66. The annular member 54 may also be conveniently made of frangible material and may be provided with an inscription so as to permit detection of tampering therewith.

FIGS. 7, 8 and 9 show perspective views of modifications of the sealing cup 24 of FIGS. 1–3. As seen in FIG. 7, the cup may have holes on the cylindrical side walls as shown at 34 and 36 or holes on the end wall 28 as shown at 34' and 36', or a combination of both for the passage of the seal wire.

The modification of FIG. 8 comprises a cup-like member 24 having a cylindrical portion 26 and an end wall portion 28 provided with a substantially centrally disposed aperture 30, thus substantially similar to the cup-like member 24 precedently described. Upon the end wall 28 of the cup-like member is mounted an annular member 68, soldered, welded or otherwise fastened to the end wall, and provided with a substantially centrally disposed aperture 70 registering with the aperture 30 of end wall 28, annular member 68 being provided with holes such as 34 and 36 for the passage of the seal wires. FIG. 9 shows a modification consisting of generally annular member 72 mounted upon the end wall 28 of a cup-like member and provided with a centrally disposed aperture 74 registering with aperture 30 in end wall 28, the annular member 72 having diametrically opposed ears 76 and 78 having holes 34 and 36 for the passage of the seal wire.

A seal means such as annular member 54, shown in perspective view in FIG. 11, and adapted to be normally mounted preferably upon the transmission housing end of the cable sheath 12 could also be used on the speedometer housing end thereof and can have any convenient modified shape such as shown in FIG. 12 wherein an annular member 80 provided with a central aperture 56 has a projecting portion or ear 82 having holes, such as 58, for the passage of the seal wire.

The sealing means of the invention as hereinbefore described and which prevents disconnecting the speedometer cable either from the speedometer head housing or from the transmission fitting ends without destroying or damaging the seal cup-like member or annular member, the seal wires or the frangible cast seals, may be incorporated as original equiment in new automobiles without any modification of the speedometer cable or cable sheath as long as the cup-like member and the annular member are threaded over the cable sheath 12 before mounting of the fittings. For mounting upon an automobile having a conventional speedometer cable already mounted between the speedometer head housing and the transmission housing, sealing means such as illustrated in FIGS. 10 and 13 are the full equivalents of the sealing means precedently described.

As shown in FIG. 10, cup-like member 24' comprises two half-cup portions 84 and 86 hinged by means of peripherally disposed hinging means 88, the end wall 90 of half-cup portion 84 having a tongue-like projection 92 projecting over the surface of end wall 94 of half-cup portion 86 which is provided with a hole 96 substantially aligned with a corresponding hole (not shown) in end wall 94 of half-cup portion 86, through which a seal wire such as 38 may be conveniently threaded. In addition the cup-like member 24' may have additional holes such as shown at 34 and 36 through which the seal wire may also be threaded.

FIG. 13 shows a modification of the seal annular member of FIG. 11, wherein the annular member 54' comprises two half-annular protions 100 and 102, hinged as shown at 104 by having one of the portions such as 100 being provided with a tongue member 106 bent over so as to be disposed over the surface of disc portion 102, with a conventional fastener such as a rivet 108 for holding the two portions together, and a second tongue-like projection integral with one of the half annular portions, as shown at 109, projecting over the surface of the other portion 100 and provided with a hole 110, substantially aligned with a hole, not shown, in the portion 110 so to provide a passage for a seal wire such as 60. Other conveniently disposed apertures such as shown at 58 are provided for affording further passages to the seal wire, if so required, and the two hinged annular portions 100 and 102 may be opened so as to be passed around the transmission end of the speedometer cable sheath, and brought together so as to have hole 110 of projecting tongue 109 aligned with the appropriate hole in the other portion so that the sealing wire can be passed through the aligned holes.

When the sealing means of the invention are mounted in appropriate positions, and the seal wires are adequately threaded substantially taut through the appropriate holes, the speedometer cable cannot be disconnected from the speedometer head housing as well as from the transmission housing without breaking the seal wire, the sealing cup-like or annular members or the cast seals securing the seal wire ends. Consequently, any unauthorized or fraudulent tampering with the speedometer cable couplings are readily detected upon visual inspection of the sealing means.

It is evident that authorized repair establishments and franchised automobile dealers may carry a stock of seal elements and be equipped with appropriate cast seal members and seal applicators providing an appropriate impression upon the surface of the substantially soft cast seals for replacing seals after repairs to the automobile transmission or speedometer or after replacing a broken speedometer drive cable.

Having thus described the invention with respect to a few preferred examples thereof, adaptations and modifications whereof will readily become apparent to those skilled in the art, what it is desired to protect by Letters Patent is:

1. In combination with a mileage and speed indicator, a flexible shaft drive, first disconnectable coupling means on one end of said flexible shaft drive for driving said indicator and second disconnectable means on the other end of said flexible shaft drive for connection to a driving means, protective means for preventing unauthorized tampering with at least one of said coupling means comprising: an annular seal member surrounding said flexible shaft drive proximate said coupling means and adapted to normally remain loosely attached to said flexible shaft drive, said annular seal member being shaped as a flat washer having substantially centrally disposed apertures for passage therethrough of said flexible shaft, a seal wire threaded through appropriate holes in said annular seal member for permanently attaching said annular seal member to a portion of said indicator and frangible seal means securing the ends of said seal wire.

2. The protective means of claim 1 wherein said annular seal member is made of frangible material.

3. The protective means of claim 1 wherein said annular seal member comprises an integral projecting ear-like member provided with apertures for the passage of said seal wire.

4. The protective means of claim 1 wherein said annular seal member comprises two flat substantially semi-annular members coplanarly hinged along a diameter thereof and provided with superimposed integral portions having aligned apertures through which said seal wire is threaded.

5. The protective means of claim 1 further comprising a second annular seal member surrounding said flexible shaft drive proximate the other of said coupling means and adapted to remain loosely attached to said flexible shaft drive, a seal wire attaching said annular seal member to the fastening means of the other said coupling means, and frangible seal means securing the ends of said seal wire.

References Cited

UNITED STATES PATENTS

| | | | |
|---|---|---|---|
| 936,862 | 10/1909 | Burgest et al. | 292—307.2 |
| 1,154,960 | 9/1915 | Baruch | 292—307.2 |
| 1,481,268 | 1/1924 | Ohmer et al. | 64—2 |
| 1,870,040 | 8/1932 | Dietze | 292—307.2 |
| 1,947,937 | 2/1934 | Hennig | 64—3 |
| 2,519,828 | 8/1950 | Earnest | 64—3 |
| 3,110,165 | 11/1963 | Eastland | 64—3 |
| 3,284,121 | 11/1966 | Lyon | 292—307 |

FRED C. MATTERN, JR., *Primary Examiner.*

H. C. COE, *Assistant Examiner.*